No. 867,234. PATENTED OCT. 1, 1907.
T. BEHAN.
SAFETY VALVE FOR AIR BRAKES.
APPLICATION FILED JULY 12, 1907.
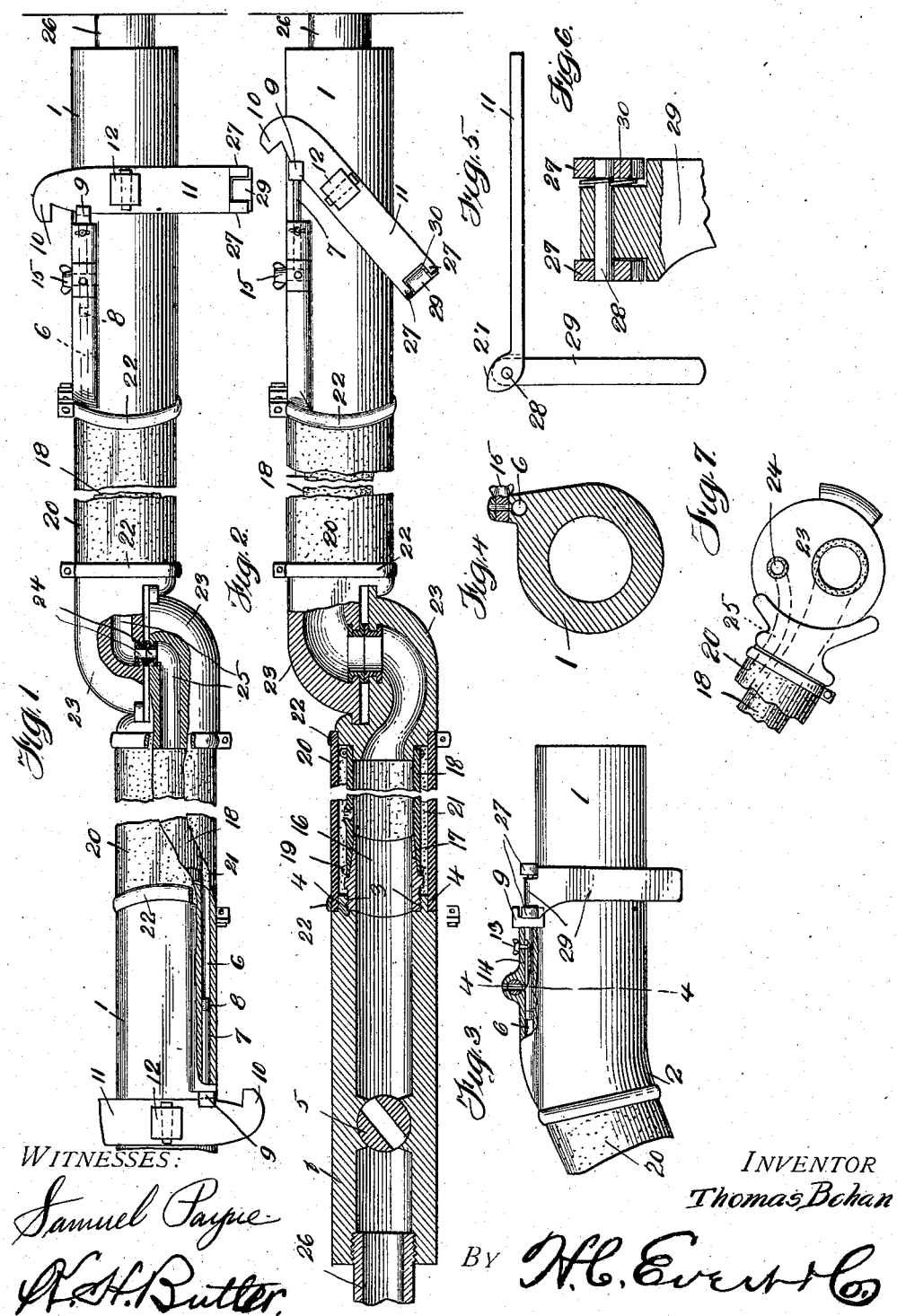
WITNESSES:
INVENTOR
Thomas Behan
BY
Attorneys

_UNITED STATES PATENT OFFICE._

THOMAS BEHAN, OF ALIQUIPPA, PENNSYLVANIA.

SAFETY-VALVE FOR AIR-BRAKES.

No. 867,234.    Specification of Letters Patent.    Patented Oct. 1, 1907.

Application filed July 12, 1907. Serial No. 383,432.

*To all whom it may concern:*

Be it known that I, THOMAS BEHAN, a citizen of the United States of America, residing at Aliquippa, in the county of Beaver and State of Pennsylvania, have invented certain new and useful Improvements in Safety-Valves for Air-Brakes, of which the following is a specification, reference being had therein to the accompanying drawing.

This invention relates to safety valves for air brakes, and is designed as an improvement upon the invention disclosed in United States Letters Patent No. 852,157, granted to me under date of April 30, 1907.

The primary object of the present improvement is, to provide an attachment for the lever employed in the patented device above referred to, to prevent the entire closing of the safety valve in case of an accidental break in the train pipe.

The construction of the improvement will be fully described hereinafter, in connection with the accompanying drawing, and its novel features will be defined in the appended claims.

In the drawing:—Figure 1 is a plan view partly broken away and partly in section of the invention applied to the train pipes, and hose connections of an air brake system, Fig. 2 is a view partly in plan, and partly in longitudinal section, Fig. 3 is a detail side elevation, Fig. 4 is a transverse section on the line 4—4 of Fig. 3, Fig. 5 is a side elevation of the valve-operating lever and its depending pivoted arm, Fig. 6 is a sectional view illustrating the pivotal connection of the depending arm of the lever, and Fig. 7 is a plan of one of the hose couplers showing a hose attached thereto and broken away.

The reference numeral 1 designates a section of pipe one end of which is bent downward at an angle as at 2, and provided with internal screw-threads 3 and a hose seat 4. The pipe section 1 conforms substantially to an elongated angle cock 5 which controls the passage of air through said pipe. The pipe 1 is provided with a longitudinal bore 6 which extends from the angle end of the pipe to the opening which receives the valve 5 and within the bore 6 is a piston 7 provided at one end with a head 8, having packing rings. The opposite end of the piston 7 is provided with a U-shaped head 9 adapted to span and engage the angular end 10 of a lever 11 fulcrumed upon the squared end 12 of the plug or cock 5.

The piston 7 is provided with a longitudinal groove 14 and engaging in said groove is a screw 15 carried by the pipe 1 said screw acting as a stop limit the movement of the piston within the bore 6 and also to guide the piston therein.

Engaging in the end 2 of the pipe 1 is a nipple 16, having a tapering end 17 upon which a section of hose 18 is secured by a suitable clamp 19, and surrounding the hose 18 is another hose 20 of larger diameter than the hose 18 providing an annular space 21, between the two hose sections said space communicating with the bore 6 of the pipe 1. The end of the hose 20 is secured upon the seat 4 by a clamp 22.

One of the hose couplings employed in connection with my improved safety valve is illustrated in Fig. 7 of the drawing, said coupling being of the ordinary type except that its face 23 is provided with an auxiliary port 24, communicating by a port 25 with the annular space 21.

The pipe sections 1 are suitably connected to the respective sections of the train line pipe 26 as shown.

One end of the lever 11 is bifurcated to provide ears 27 which are perforated to receive a pivot pin 28 from which is suspended an arm 29. A split washer 30 is interposed between one side of the arm 29 and the adjacent ear 27 of the lever to maintain said arm in proper relation with the lever.

In operation, the air of one train line has direct passage through the hole 16 and the pipe 1 to another train line when connections are established between two cars. Should the hose 16 burst, the air entering the annular space 21 will pass into the bore 6, and force the piston head 8 outwardly causing the head 9 of the piston to strike the end 10 of the lever 11 of the valve 5, thus operating said valve and shutting off the air of the train pipes.

The ordinary plug valves will be used in connection with the train pipe 26, whereby a train pipe on the last car may be closed to prevent the air from escaping when the train is in operation.

The arm 29 depending from the lever 11 limits the movement of the said lever, and prevents the complete closing of the valve 5 and this arm, is a distinguishing characteristic of the present invention not disclosed in the Letters Patent hereinbefore referred to.

Having fully described my invention what I claim and desire to secure by Letters Patent, is 1. In a coupling for air brake system, the combination with two train pipe sections, of angle pipe sections connected to the adjacent ends of the train pipe sections, a valve in the passage-way of each angle pipe section, a longitudinal auxiliary passage-way in each angle pipe section, pistons in said auxiliary passage-ways having their rods extending outside of the angle pipe sections, and provided with heads, levers carried by said valves, and engaged by the heads on said piston rods, sections of hose arranged one within the other, connecting said coupling members with the angle pipe sections, the space between said hose sections communicating with the auxiliary passage-way in the angle pipes, and an arm 29 depending from each of said levers.

2. In a coupling for air brake systems, the combination with two train pipe sections, of angle pipe sections connected to the adjacent ends of the train pipe sections, a valve in each angle pipe section an auxiliary passage-way in each angle pipe section, a piston in each of said auxiliary passage-ways having one end extending outside the passage way, and provided with a head a lever on the valve engaged by said head, an arm pivotally secured to said lever and serving to limit its movement, coupling members, coupling pipes connecting said coupling members with the angle pipe sections, and air-tight pipes surrounding the coupling pipes.

3. A train pipe safety device comprising an angle pipe section, a plug valve therein, an auxiliary passage-way in the pipe section, a piston therein, having one end extending outside of the passage way, U-shaped head on said end, a lever on said valve, engaged by said head a stop carried by the angle pipe section engaging in a groove in the piston and limiting the travel of said piston, an arm pivotally secured to said lever, and a split washer on the pivotal support of said arm.

In testimony whereof I affix my signature in the presence of two witnesses.

THOMAS BEHAN.

Witnesses:
 MAX H. SROLOVITZ,
 K. H. BUTLER.